(12) United States Patent
Riss et al.

(10) Patent No.: US 11,420,396 B2
(45) Date of Patent: Aug. 23, 2022

(54) 3D OBJECT PARTS AND CAGE FABRICATION

(71) Applicants: Hewlett-Packard Development Company, L.P., Spring, TX (US); Instituto Atlântico, Fortaleza (BR)

(72) Inventors: Marcelo Aita Riss, Porto Alegre (BR); Alyne Gomes Soares Cantal, Fortaleza (BR); Thiago Barbosa Lima De Moura, Fortaleza (BR); Ana Patricia Del Angel, Guadalajara (MX); Jun Zeng, Palo Alto, CA (US); Scott White, Boise, ID (US); Sebastia Cortes I Herms, Sant Cugat del Valles (ES)

(73) Assignees: Hewlett-Packard Development Co., L.P., Spring, TX (US); Instituto Atlantico, Fortaleza (BR)

( * ) Notice: Subject to any disclaimer, the term of this patent is extended or adjusted under 35 U.S.C. 154(b) by 272 days.

(21) Appl. No.: 16/754,248

(22) PCT Filed: Oct. 31, 2017

(86) PCT No.: PCT/US2017/059311
§ 371 (c)(1),
(2) Date: Apr. 7, 2020

(87) PCT Pub. No.: WO2019/089005
PCT Pub. Date: May 9, 2019

(65) Prior Publication Data
US 2021/0197489 A1 Jul. 1, 2021

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/171* (2017.08); *B29C 64/40* (2017.08);
(Continued)

(58) Field of Classification Search
CPC ..... B29C 64/393; B29C 64/171; B29C 64/40; B29C 64/182; B29C 64/10; B29C 64/386;
(Continued)

(56) References Cited

U.S. PATENT DOCUMENTS 9,248,611 B2   2/2016 Divine et al.
9,690,274 B1 * 6/2017 Markov ................ B33Y 50/02
(Continued)

FOREIGN PATENT DOCUMENTS

CN   203734300 U   7/2014
WO   WO-2017162781 A1   9/2017

OTHER PUBLICATIONS

Joung, Y-K. et al., Intelligent 3D Packing Using a Grouping Algorithm for Automotive Container Engineering, Apr. 2014, 12 pgs, http://www.sciencedirect.com/science/article/pii/S228843001450019X.

*Primary Examiner* — Ronald D Hartman, Jr.
(74) *Attorney, Agent, or Firm* — Mannava & Kang (57) ABSTRACT

According to examples, a three-dimensional (3D) fabrication system may include fabrication components and a controller. The controller may control the fabrication components to fabricate parts of a 3D object in a build envelope, the parts to be assembled together to form the object, and in which the parts are fabricated at locations corresponding to relative positions of the parts with respect to each other in the assembled object. The controller may also control the fabrication components to fabricate a cage around the parts in the build envelope.

15 Claims, 4 Drawing Sheets

(51) Int. Cl.
    *B33Y 30/00*     (2015.01)
    *B33Y 50/02*     (2015.01)
    *B29C 64/171*     (2017.01)
    *B29C 64/40*     (2017.01)

(52) U.S. Cl.
    CPC ............... *B33Y 10/00* (2014.12); *B33Y 30/00* (2014.12); *B33Y 50/02* (2014.12)

(58) Field of Classification Search
    CPC ......... B33Y 10/00; B33Y 30/00; B33Y 50/02; B33Y 40/00; B33Y 50/00
    See application file for complete search history.

(56) References Cited

U.S. PATENT DOCUMENTS

| | | |
|---|---|---|
| 2006/0108704 A1 | 5/2006 | Geiwald et al. |
| 2007/0259010 A1 | 11/2007 | Yoo et al. |
| 2015/0145158 A1 | 5/2015 | Levine et al. |
| 2015/0269289 A1 | 9/2015 | Kim et al. |
| 2016/0279879 A1 | 9/2016 | Zheng et al. |
| 2017/0037674 A1 | 2/2017 | Hooper et al. |
| 2017/0232682 A1* | 8/2017 | Alcantara Marte ..... B22F 10/20 264/497 |
| 2017/0232683 A1* | 8/2017 | Alcantara Marte ... B29C 64/153 264/497 |
| 2017/0297097 A1* | 10/2017 | Gibson ..................... B22F 7/02 |
| 2018/0056595 A1* | 3/2018 | Sterenthal ............... B29C 64/40 |
| 2018/0243828 A1* | 8/2018 | Hoferer .................. B33Y 10/00 |
| 2018/0345372 A1* | 12/2018 | Corsmeier ............. B22F 10/70 |
| 2018/0370155 A1* | 12/2018 | Courter ................ G03G 15/225 |
| 2019/0009368 A1* | 1/2019 | Levine .................. B29C 64/153 |
| 2019/0351612 A1* | 11/2019 | Huang ................. B29C 64/379 |
| 2020/0130256 A1* | 4/2020 | Debora ..................... B32B 27/08 |
| 2021/0114290 A1* | 4/2021 | Huang .................. B29C 64/218 |
| 2021/0197493 A1* | 7/2021 | Mark ..................... B22F 10/20 |

\* cited by examiner

3D OBJECT PARTS AND CAGE FABRICATION

BACKGROUND

In three-dimensional (3D) printing, an additive printing process is often used to make three-dimensional solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat and/or a chemical binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are 3D fabrication systems, apparatuses, and methods that may be implemented to fabricate parts that may be assembled together to form a 3D object. The 3D fabrication systems and apparatuses disclosed herein may include a controller that may control the 3D fabrication system to fabricate the parts at locations corresponding to relative positions of the parts with respect to each other in the assembled 3D object. In other words, the parts of the 3D object may be fabricated in relatively close proximities to the locations at which the parts are to be assembled together following a complete fabrication of the parts. A complete fabrication of the parts may include fabrication and finishing of the parts.

The controller disclosed herein may also design or model a cage to be fabricated around the parts, in which the cage may be fabricated concurrently with the parts. The cage may be modeled such that the barriers of the cage are fabricated at sufficient thermal distances from the parts to prevent the barriers from adversely affecting the formation of the parts. Likewise, the sufficient thermal distances may prevent the parts from adversely affecting the formation of the barriers. The cage may protect the parts, may keep the parts together, and may also keep the parts private.

The controller may control fabrication components to fabricate the parts and the cage in a concurrent fabrication operation. That is, the fabrication components may fabricate the parts and the cage during a common printing operation in a common build envelope. The controller may further control the fabrication components to fabricate instructions onto a surface of a barrier or onto surfaces of multiple barriers of the cage. The instructions may be fabricated as 2D and/or 3D features.

The controller disclosed herein may further design or model removable supports that may link some of the parts to each other and/or some of the parts to the barriers of the cage. The removable supports may thus be designed to maintain the parts near the locations at which the parts are to be assembled or joined to form the 3D object. In addition, the removable supports may be designed to be broken off the parts, for instance, by hand. The controller may still further control the fabrication components to fabricate the removable supports concurrently, e.g., in the same build operation, as the parts and the cage.

Through implementation of the 3D fabrication systems, apparatuses, and methods disclosed herein, parts to be assembled to form a 3D object may be fabricated at or near the locations at which the parts are to be assembled. In one regard, following fabrication of the parts, assembly of the parts may be relatively simpler than in instances in which the parts are arranged in other locations. In addition, through fabrication of a cage with the parts, the parts may be kept together and may be protected. Moreover, through fabrication of the removable supports, the parts may be maintained at desired locations following fabrication of the parts.

Before continuing, it is noted that as used herein, the terms "includes" and "including" mean, but is not limited to, "includes" or "including" and "includes at least" or "including at least." The term "based on" means "based on" and "based at least in part on."

Figure 1A:
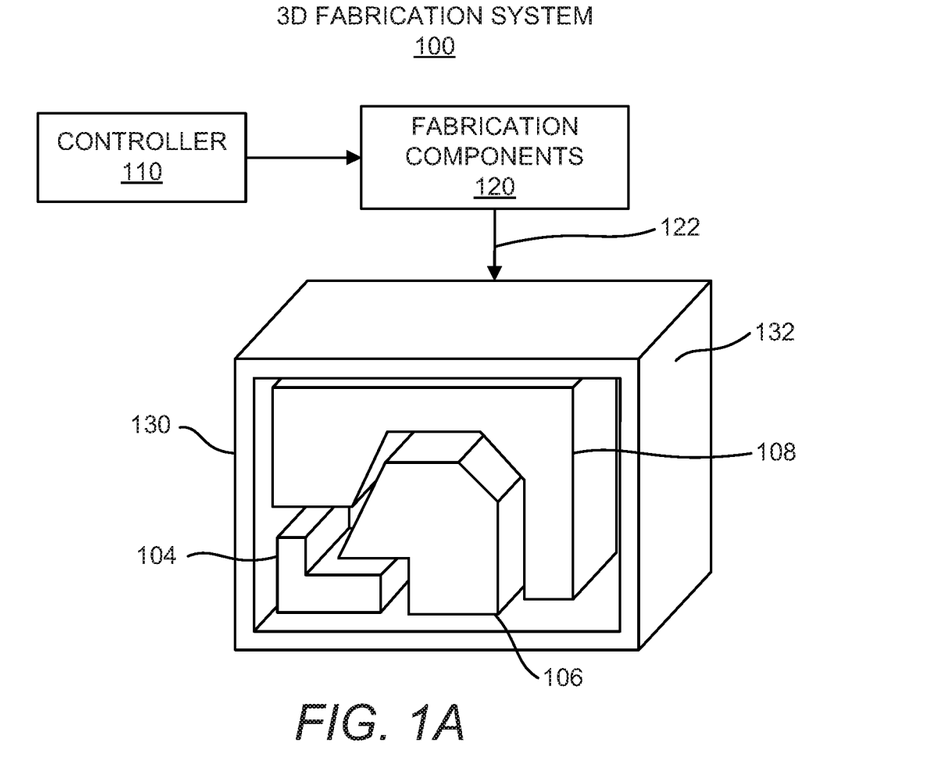
FIG. 1A shows a diagram of an example 3D fabrication system that may form fabricate parts that may be assembled together to form a 3D object.
Figure 1B:
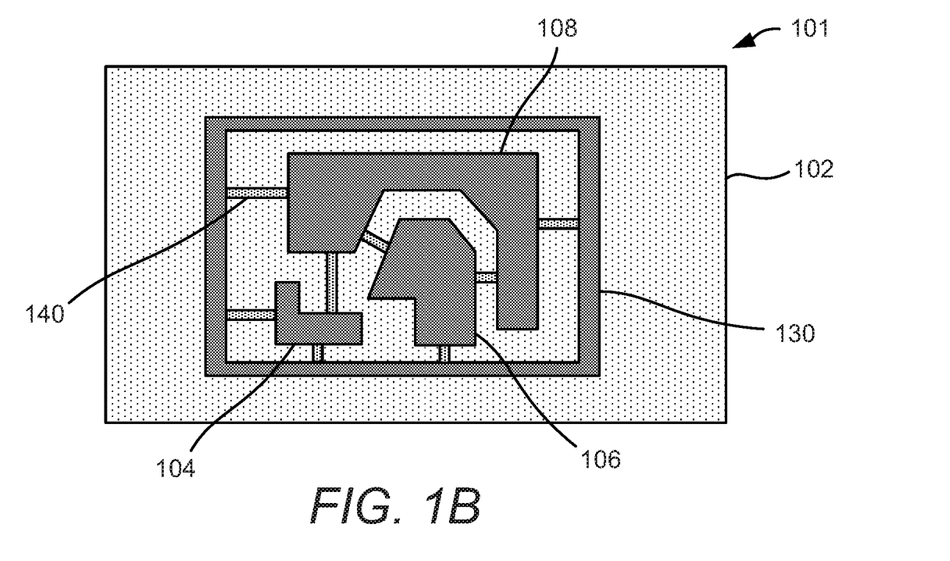
FIG. 1B shows a cross-sectional front view of a build envelope of the example 3D fabrication system depicted in FIG. 1A.

Reference is first made to FIGS. 1A and 1B. FIG. 1A shows a diagram of an example 3D fabrication system 100 that may fabricate parts that may be assembled together to form a 3D object. FIG. 1B shows a cross-sectional front view of a build envelope 101 of the example 3D fabrication system 100 depicted in FIG. 1A. It should be understood that the 3D fabrication system 100 depicted in FIG. 1A may include additional components and that some of the components described herein may be removed and/or modified without departing from a scope of the 3D fabrication system 100 disclosed herein.

The 3D fabrication system 100 may also be termed a 3D printer, a 3D fabricator, or the like. Generally speaking, the 3D fabrication system 100 may be implemented to fabricate parts 104-108 of 3D objects from particles 102 of build material, which may also be termed build material particles 102. The particles 102 of build material may include any suitable material including, but not limited to, a polymer, a plastic, a ceramic, a nylon, a metal, combinations thereof, or the like, and may be in the form of a powder or a powder-like material. Additionally, the particles 102 may be formed to have dimensions, e.g., widths, diameters, or the like, that are generally between about 5 µm and about 100 µm. In other examples, the particles 102 may have dimensions that are generally between about 30 µm and about 60 µm. The particles 102 may have any of multiple shapes, for instance, as a result of larger particles being ground into smaller particles. In some examples, the powder may be formed from, or may include, short fibers that may, for example, have been cut into short lengths from long strands or threads of material.

As shown in FIG. 1A, the 3D fabrication system 100 may include a controller 110 and fabrication components 120. As discussed herein, in some examples, the fabrication components 120 may include an agent delivery system. The fabrication components 120 may also or in other examples include an energy supply system. In particular examples, the fabrication components 120 may include a laser beam device. In any of these examples, the fabrication components 120 may be implemented to solidify particles 102 in selected locations of the build envelope 102 to fabricate a plurality of parts 104-108. The fabrication components 120 may also be implemented to solidify particles 102 in other selected locations of the build envelope 102 to fabricate a cage 130 around the parts 104-108. As shown, the fabrication components 120 may fabricate the parts 104-108 and the cage 130 in conjunction with each other in a common build envelope 101, e.g., in a common fabrication cycle, process, etc. In other words, the fabrication components 120 may fabricate the parts 104-108 and the cage 130 concurrently.

According to examples, the fabrication components 120 may solidify the particles 102 in the selected locations through application of a chemical binder, such as an adhesive, onto the particles 102. In addition, or in other examples, the fabrication components 120 may solidify the particles 102 through deposition of a fusing agent onto the particles 102 that enhances absorption of energy. That is, the fabrication components 120 may include an agent delivery device that may deliver the fusing agent in the form of droplets onto the particles 102 such that the droplets of fusing agent may be dispersed on the particles 102 and within interstitial spaces between the particles 102 forming the feature 104. In these examples, the fabrication components 120 may also apply energy onto the particles and the fusing agent may be a liquid, such as an ink, a pigment, a dye, or the like, that may enhance absorption of the applied energy. The enhanced absorption of the applied energy may be sufficient to cause the particles 102 in contact with the fusing agent to melt while other particles may remain in solid form.

In yet other examples, the fabrication components 120 may fuse the particles 102 at selected locations of the build envelope 102 through selective application of energy onto those particles 102. In these examples, the fabrication components 120 may include a laser beam device that may selectively apply heat onto the particles 102 at the selected locations. In yet further examples, instead of forming the parts 104-108 from the particles 102, the fabrication components 120 may form the parts 104-108 from other types of materials, such as from a fluid material. In yet further examples, the fabrication components 120 may fabricate the parts 104-108 through fusion deposition modeling.

As shown in FIGS. 1A and 1B, the parts 104-108 and the cage 130 may be fabricated such that there may exist gaps between the parts 104-108 with respect to each other and between the parts 104-108 and the interior surfaces of the cage 130. The parts 104-108 and the cage 130 may be formed with the gaps to prevent the parts 104-108 and the cage 130 from bonding together during their fabrication. As discussed herein, the parts 104-108 may be parts of a 3D object that is to be formed through assembly or joining of the parts 104-108. The parts 104-108 may be fabricated as separate components of the 3D object, for instance, to facilitate a finishing process to be applied on the parts 104-108 following fabrication of the parts 104-108. That is, for example, the parts 104-108 may be finished, e.g., polished, cleaned, colored, etc., in a relatively simpler manner than finishing the 3D object with the parts 104-108 assembled or joined together.

According to examples, to facilitate the assembly of the parts 104-108 in their correct locations to form the 3D object, the parts 104-108 may be fabricated at locations corresponding to relative positions of the parts 104-108 with respect to each other in the assembled 3D object. Thus, for instance, following fabrication of the parts 104-108 and the cage 130, the parts 104-108 may be removed from the cage 130 and assembled together based on their respective locations in the cage 130. Although not shown, the parts 104-108 may be fabricated with mating components to facilitate joining of the parts 104-108 to form the 3D object. In addition or in other examples, the parts 104-108 may be assembled or joined together using mechanical fasteners, adhesives, melting, combinations thereof, or the like.

As shown in FIG. 1B, the parts 104-108 may be maintained in their respective placements by removable supports 140 that may link some parts 104-108 to each other and may link some parts 104-108 to the cage 130. The removable supports 140 may be fabricated with the parts 104-108 and the cage 130 to maintain the parts 104-108 at their intended positions during and/or following fabrication of the parts 104-108. According to examples, the removable supports 140 may be formed to be relatively easily be broken off or otherwise removed from the parts 104-108 as some point following formation of the parts 104-108 and the removable supports 140. For instance, the removable supports 140 may be fabricated in manners that make the removable supports 140 be relatively weaker than the parts 104-108 and the cage 130. As examples, the removable supports 140 may be fabricated to have a higher porosity level than the parts 104-08 and the cage 130, the removable supports 140 may be fabricated to include a weaker material than the parts 104-108 and the cage 130, the removable supports 140 may be fabricated to have a relatively thinner profile than the parts 104-108 and the cage 130, or the like.

The removable supports 140 may also be fabricated to include other distinguishing physical characteristics from the parts 104-108. For instance, the removable supports 140 may be fabricated to have a color or multiple colors that are distinguished from the colors of the parts 104-108. The removable supports 140 may also or in other examples be color-coded to enable the removable supports 140 to be distinguished from each other. For instance, the colors of the removable supports 140 may signify an order in which the removal supports 140 are to be removed following fabrication of the parts 104-108 and the removable supports 140. The removable supports 140 may also include indicia that may distinguish the removable supports 140 from each other, for instance, to signify the order in which the removable supports 140 are to be removed. Some of the removable supports 140 may also be fabricated to have different sizes with respect to each other, for instance, to bridge gaps of different sizes, to support parts 104-108 having different weights, or the like.

It should be understood that the cage 130 may include barriers 132 that encompass the parts 104-108 and that a front barrier 132 has been removed from FIG. 1A to enable the parts 104-108 to be readily visible in FIG. 1A. It should also be understood that the configurations of the parts 104-108 and the cage 130 depicted in FIGS. 1A and 1B, as well as in other figures, are shown for purposes of illustration and not of limitation. In this regard, the parts 104-108 and the cage 130 may have different shapes, configurations, numbers of parts, etc., that those shown in FIGS. 1A and 1B without departing from a scope of the 3D fabrication system 100 disclosed herein.

Figure 2:
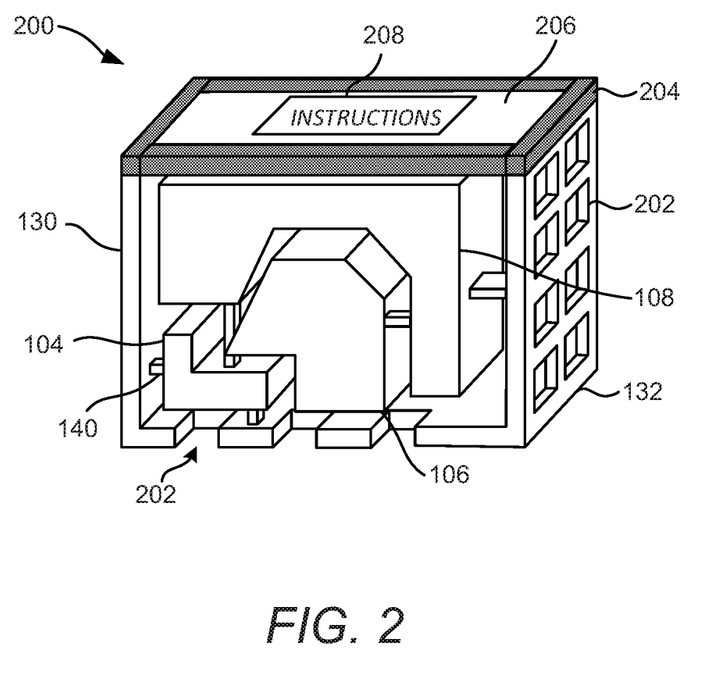
FIG. 2 shows an isometric view of an example fabricated structure containing a plurality of parts and a cage.

Turning now to FIG. 2, there is shown an isometric view of an example fabricated structure 200 containing a plurality of parts 104-108 and a cage 130. It should be understood that the features depicted in the example fabricated structure 200 are for purposes of illustration and are thus not intended to limit structures fabricated with the 3D fabrication system 100 to include the features depicted in FIG. 2.

As shown, the fabricated structure 200 may include the parts 104-108, the cage 130, and the removable supports 140 discussed above with respect to FIGS. 1A and 1B. A front barrier 132, e.g., wall, of the cage 130 has been removed to better show an interior of the cage 130. In this regard, it should be understood that the cage 130 may include barriers 132 that surround the parts 104-108. In any regard, the cage 130 may include openings 202 on one or a plurality of the barriers 132 forming the cage 130. According to examples, the openings 202 may enable particles 102 that are not used to form the parts 104-108, the cage 130, or the removable supports 140 inside of the cage 130 to be expelled from the cage 130. In other examples, the openings 202 may be omitted, for instance, to prevent the parts 104-108 from being visible through the barriers 132 of the 130. In these examples, the cage 130 may function as a security measure to keep the components 104-108 private.

The cage 130 may also include connection border 204, e.g., which may include frangible sections at connection locations between a top barrier 206 and the side barriers 132. As examples, the connection border 204 may be fabricated to have a higher porosity level than the other sections of the barriers 132, the connection border 204 may be fabricated to include a different material than the other sections of the barriers 132, the connection border 204 may be fabricated to have a relatively thinner profile than the other sections of the barriers 132, or the like. Generally speaking, the connection border 204 may enable the top barrier 206 to be removed from the other barriers 132 such that the parts 104-108 may be accessed.

The cage 130 may further include instructions 208 that may be fabricated on a surface of the barrier 206, or on another barrier 132. The instructions 208 may pertain to instructions regarding the assembly of the parts 104-108, instructions pertaining to finishing operations to be performed on the parts 104-108, a combination thereof, or the like. The instructions 208 may additionally or in other examples, be fabricated on an interior surface of the barrier 206 or on another barrier 132. Furthermore, the instructions 208 may be fabricated as 2D and/or 3D features in the form of text, diagrams, symbols, or the like.

Figure 3:
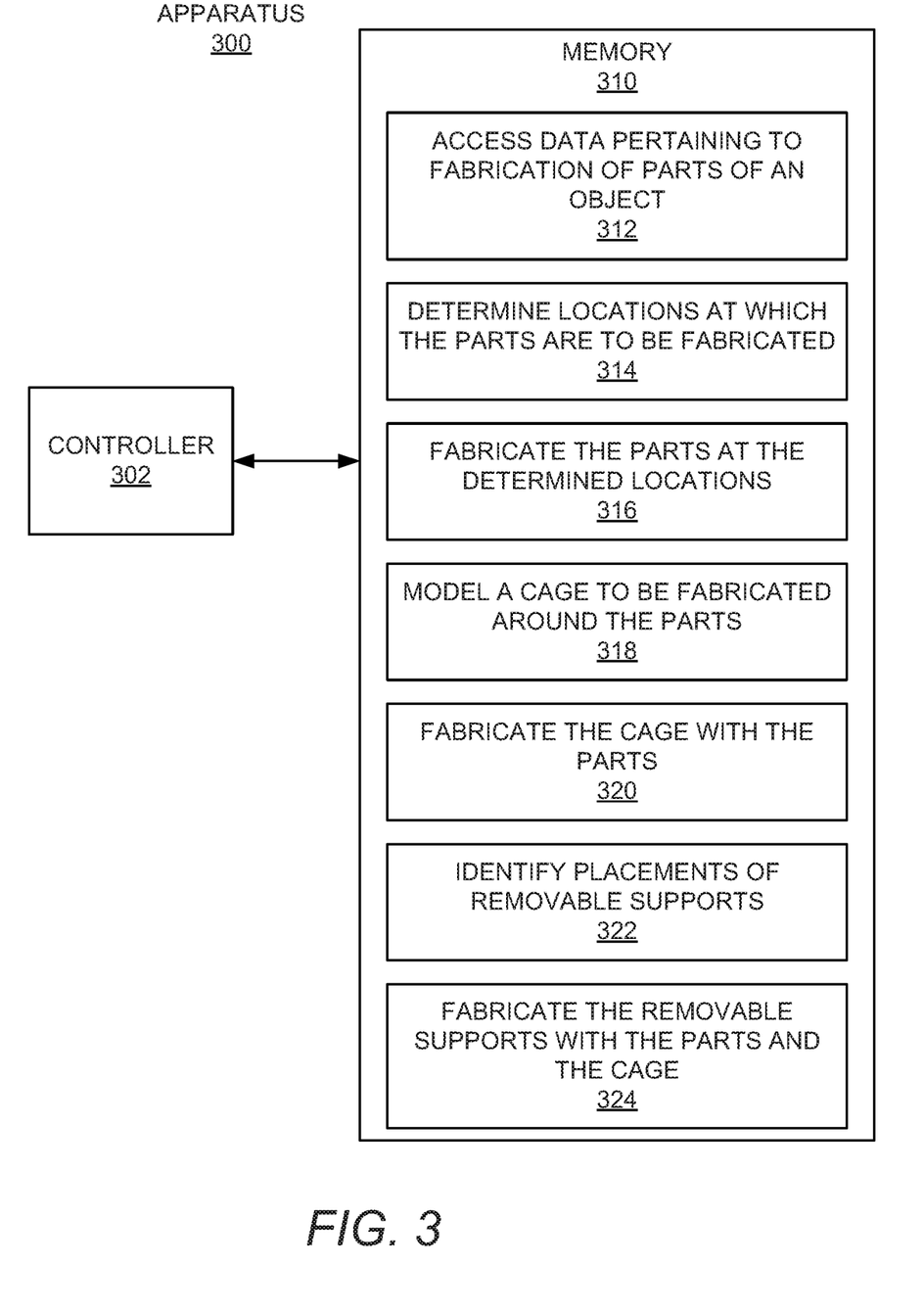
FIG. 3 shows a block diagram of an example apparatus that may fabricate parts that may be assembled together to form an object.

With reference now to FIG. 3, there is shown a block diagram of an example apparatus 300 that may fabricate parts that may be assembled together to form an object. It should be understood that the example apparatus 300 depicted in FIG. 3 may include additional features and that some of the features described herein may be removed and/or modified without departing from the scope of the apparatus 300. In addition, the features of the apparatus 300 are described with respect to the components of the 3D fabrication system 100 discussed above with respect to FIG. 1A and the fabricated structure 200 discussed above with respect to FIG. 2.

Generally speaking, the apparatus 300 may be a computing device, a control device of a 3D fabrication system 100, or the like. As shown in FIG. 3, the apparatus 300 may include a controller 302 that may control operations of the apparatus 300. The controller 302 may be equivalent to the controller 110 discussed above. The controller 302 may be a semiconductor-based microprocessor, a central processing unit (CPU), an application specific integrated circuit (ASIC), a field-programmable gate array (FPGA), and/or other suitable hardware device.

The apparatus 300 may also include a memory 310 that may have stored thereon machine readable instructions 312-324 (which may also be termed computer readable instructions) that the controller 302 may execute. The memory 310 may be an electronic, magnetic, optical, or other physical storage device that contains or stores executable instructions. The memory 310 may be, for example, Random Access memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The controller 302 may fetch, decode, and execute the instructions 312 to access data pertaining to fabrication of a plurality of parts 104-108 of an object. As discussed herein, the parts 104-108 may be items that are to be assembled together to form the object at some point in time following fabrication of the parts 104-108. The controller 302 may access the data from an instruction file, such as a computer aided design file, containing information regarding the parts 104-108 to be fabricated. The data may define, for instance, the configurations of the parts 104-108, the respective locations at which the parts 104108 are to be assembled with each other, the colors of the parts 104-108, or the like.

The controller 302 may fetch, decode, and execute the instructions 314 to determine the locations at which the parts 104-108 are to be fabricated with respect to each other in a build envelope 101. That is, for instance, the controller 302 may determine a packing arrangement for the parts 104-108 in the build envelope 101 such that the parts 104-108 may be fabricated at locations in the build envelope 101 corresponding to the relative positions of the parts 104-108 in the assembled object. The controller 302 may also determine the packing arrangement for the parts 104-108 in the build envelope 101 such that the parts 104-108 may be fabricated at locations that enable the parts 104-108 to be spaced apart from each other by a sufficient distance to prevent adverse effects from thermal bleed from occurring between the particles 102 forming the parts 104-108. Adverse effects from thermal bleed may occur, for instance, when a first part 104 is within a certain distance from a second part 106 such that heat from the particles 102 forming the second part 106 heats the particles 102 in the first part 104 beyond an intended temperature. The extra heat may result in those particles 102 of the first part 104 failing to properly melt and fuse together.

According to examples, the controller 302 may determine the locations at which the parts 104-108 are to be fabricated with respect to each other in the build envelope 101 through implementation of an electrostatic simulation on the parts 104-108. That is, for instance, the controller 302 may assign electrical charges of the same polarity with the same area density at the interfaces of the parts 104-108. The controller 302 may then run an electrostatic simulation to simulate electro-repulsive forced to push the parts 104-108 apart from each other. The controller 302 may simulate the parts 104-108 as being placed in a viscous fluid to numerically stabilize the simulation. The controller 302 may stop the simulation when minimal gaps between the parts 104-108 exceed a designed inter-part distance. In other examples, the controller 302 may stop the simulation when thermal diffusion is simulated with the electro-repulsive simulation such that the designed inter-part distance between the parts 104-108 is thermo-driven. That is, the controller 302 may stop the simulation when the parts 104-108 are at sufficient distances with respect to each other to prevent the adverse effects of thermal bleed among the parts 104-108.

Following cessation of the simulation, the controller 302 may determine whether any of the parts 104-108 remain interlocked with any of the other parts 104-108. The controller 302 may keep those parts in their interlocked relationship. However, for other parts 104-108 that may freely move with respect to each other, the controller 302 may model removable supports 140 that may limit or prevent the free movement of those parts 104-108 as discussed herein.

The controller 302 may fetch, decode, and execute the instructions 316 to fabricate the parts 104-108 at the determined locations. The controller 302 may control the fabrication components 120 to fabricate the parts 104-108 in any of the manners discussed herein.

The controller 302 may fetch, decode, and execute the instructions 318 to model a cage 130 to be fabricated around the parts 104-108. The data pertaining to fabrication of the parts 104-108 may not include data pertaining to the cage 130. As such, for instance, the controller 302 may design a cage 130, e.g., a bounding box, for the parts 104-108 that is sufficiently distant from the surfaces of the parts 104-108 to comply with a thermal diffusion rule. For instance, the controller 302 may design the cage 130 with sufficient gaps from the surfaces of the parts 104-108 to prevent the barriers 132 of the cage 130 from solidifying to the parts 104-108 and to also prevent adverse effects of thermal bleed from occurring between the barriers 132 and the parts 104-108. In addition, as discussed above with respect to FIG. 2, the controller 302 may design the cage 130 to include the openings 202 and/or the instructions 208. The controller 302 may also design the cage 130 to include the connection border 204 to enable one or more of the barriers 132 to be removed from the other barriers 132.

The controller 302 may fetch, decode, and execute the instructions 320 to fabricate the modeled cage 130. The controller 302 may control the fabrication components 120 to fabricate the cage 130 in any of the manners discussed herein.

The controller 302 may fetch, decode, and execute the instructions 322 to identify placements of removable supports 140 for the parts 104-108. The data pertaining to fabrication of the parts 104-108 may not include data pertaining to the removable supports 140. As such, the controller 302 may design or model the removable supports 140 and may identify the placements of the removable supports 140 to support and maintain the parts 104-108 near the positions at which the parts 104-108 are to be assembled to form the object following fabrication of the parts 104-108. The controller may also determine characteristics of the removable supports 104-108, which as discussed above, may vary among some of the removable supports 104-108 and/or may vary from the parts 104-108 and the cage 130.

The controller 302 may fetch, decode, and execute the instructions 324 to fabricate the removable supports 104-108. The controller 302 may control the fabrication components 120 to fabricate the removable supports 104-108 in any of the manners discussed herein.

According to examples, the controller 302 may execute the instructions 316, 320, and 324 concurrently. That is, the controller 302 may fabricate the parts 104-108, the cage 130, and the removable supports 140 during a common build operation, e.g., during a common build operation in the build envelope 101. In addition, therefore, the controller 302 may not begin to fabricate the parts 104-108 until after the cage 130 is modeled and the removable supports 140 have been identified.

In other examples, instead of the memory 310, the apparatus 300 may include hardware logic blocks that may perform functions similar to the instructions 312-324. In yet other examples, the apparats 300 may include a combination of instructions and hardware logic blocks to implement or execute functions corresponding to the instructions 312-324. In any of these examples, the controller 302 may implement the hardware logic blocks and/or execute the instructions 312-324.

Figure 4:
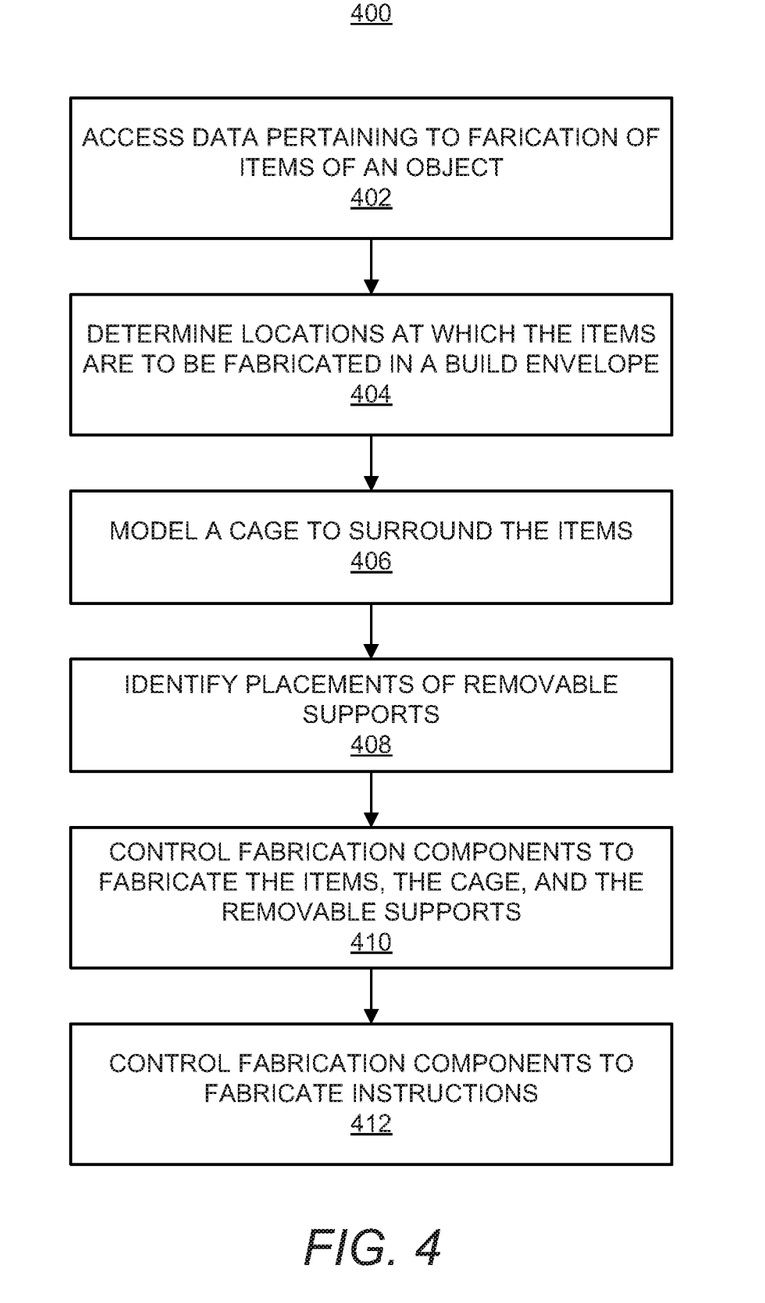
FIG. 4 depicts a flow diagram of an example method of fabricating parts that may be assembled together to form an object.

Various manners in which the controller 110, 302 may operate are discussed in greater detail with respect to the method 400 depicted in FIG. 4. Particularly, FIG. 4 depicts a flow diagram of an example method 400 of fabricating parts that may be assembled together to form an object. It should be understood that the method 400 depicted in FIG. 4 may include additional operations and that some of the operations described therein may be removed and/or modified without departing from scope of the method 400. The description of the method 400 is made with reference to the features depicted in FIGS. 1A-3 for purposes of illustration.

At block 402, the controller 110, 302 may access data pertaining to fabrication of a plurality of items 104-108 that are to be joined together to form an object. The items 104-108 may be equivalent to the parts 104-108 discussed herein. In addition, the controller 110, 302 may access the data as discussed above with respect to the instructions 312 in FIG. 3.

At block 404, the controller 110, 302 may determine locations at which the items 104-108 are to be fabricated in a build envelope 101 of a 3D fabrication system 100. The controller 110, 302 may determine the locations of the items 104-108 in any of the manners discussed above with respect to the instructions 314 in FIG. 3.

At block 406, the controller 110, 302 may model a cage 130 to surround the items 104-108. The controller 110, 302 may model the cage 130 as discussed above with respect to the instructions 318 in FIG. 3.

At block 408, the controller 110, 302 may identify placements of removable supports 140 to support the items 104-108 following fabrication of the items 104-108. The controller 110, 302 may identify the placements of the removable supports 140 as discussed above with respect to the instructions 322 in FIG. 3. As discussed herein, the controller 110, 302 may identify the placements of the removable supports 140 as including links between some of the items 104-108, links between some of the items 104-108 and the cage 130, or both.

At block 410, the controller 110, 302 may control the fabrication components 120 to fabricate the items 104-108, the cage 130, and the removable supports 140. The controller 110, 302 may control the fabrication components 120 as discussed above with respect to the instructions 316, 320, and 324 in FIG. 3. Thus, the controller 110, 302 may control the fabrication components 120 to concurrently fabricate the items 104-108, the cage 130, and the removable supports 140, e.g., during a common fabrication operation.

According to examples, the fabrication components 120 may include a recoater, an agent delivery device, and an energy source. In these examples, the recoater may be implemented to spread layers of particles 102 and the agent delivery device may be implemented to deliver droplets of a fusing agent onto selective locations of the spread layers of articles 102 to fabricate the items 104-108, the cage 130, and the removable supports 140. Thus, for instance, in at least one of the layers, the fabrication components 120 may fabricate portions of an item 104, the cage 130, and/or a removable support 140. In these examples, the removable supports 140 and/or the connection border 204 may be formed to be relatively weaker than the items 104-108 by, for instance, depositing the fusing agent at a relatively lower contone level on the particles 102 forming the removable supports 140 and/or the connection border 204.

Portions of an item 104, the cage 130, and/or a removable support 140 may also be fabricated in a layer of particles 102 in examples in which the fabrication components 120 include other types of solidification devices, e.g., a laser beam generation device. In addition, the removable supports 140 and/or the connection border 204 may be formed to be relatively weaker than the items 104-108 by, for instance, fusing lesser volumes of the particles 102 forming the removable supports 140 and/or the connection border 204.

Some or all of the operations set forth in the method 400 may be contained as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) fabrication system comprising:
    fabrication components; and
    a controller to:
        control the fabrication components to fabricate parts of a 3D object in a build envelope;
        control the fabrication components to fabricate a cage around the parts in the build envelope; and
        control the fabrication components to fabricate, on a surface of the cage, instructions pertaining to at least one of assembly of the parts, finishing of the parts, or both.

2. The 3D fabrication system of claim 1, wherein the controller further:
    controls the fabrication components to fabricate the cage during fabrication of the parts, wherein the cage is not part of the 3D object.

3. The 3D fabrication system of claim 1, wherein the controller further:
    identifies placements of removable supports to be fabricated with the parts, wherein the removable supports are to temporarily maintain the parts in the determined locations following fabrication of the parts and the cage; and
    controls the fabrication components to fabricate the removable supports at the identified placements.

4. The 3D fabrication system of claim 3, wherein the controller further:
    identifies the placements of the removable supports to include areas linking a plurality of the parts to each other and areas linking a plurality of the parts to the cage.

5. The 3D fabrication system of claim 3, wherein the controller further controls the fabrication components to fabricate the removable supports to have a different physical property than the parts.

6. The 3D fabrication system of claim 3, wherein the controller further controls the fabrication components to:
    fabricate the parts of the 3D object, the cage, and the removable supports through selective solidification of particles of build material.

7. The 3D fabrication system of claim 1, wherein the parts are to be assembled together to form the 3D object, and the parts are fabricated at locations corresponding to relative positions of the parts with respect to each other in the assembled 3D object.

8. The 3D fabrication system of claim 1, wherein the controller further controls the fabrication components to fabricate the cage with a removable barrier.

9. An apparatus comprising:
    a processor; and
    a memory storing machine readable instructions that when executed by the processor cause the processor to:
        access fabrication instructions to fabricate parts of an object, wherein the parts are to be assembled together to an object;
    fabricate, via three-dimensional (3D) fabrication, the parts at the determined locations in a build envelope;
    fabricate, via the 3D fabrication, a cage around the parts in the build envelope; and
    fabricate, via the 3D fabrication, on a surface of the cage, assembly instructions pertaining to at least one of assembly of the parts, finishing of the parts, or both.

10. The apparatus of claim 9, wherein the machine readable instructions are further executable to cause the processor to:
    prior to the fabrication of the cage in the build envelope, model the cage to be fabricated around the parts.

11. The apparatus of claim 10, wherein the machine readable instructions are further executable to cause the processor to:
    identify placements of removable supports to be fabricated with the parts, wherein the removable supports are to temporarily maintain the parts in the determined locations following the fabrication of the parts and the cage; and
    fabricate, via the 3D fabrication, the removable supports at the identified placements with the fabrication of the parts and the cage.

12. The apparatus of claim 10, wherein the machine readable instructions are further executable to cause the processor to:
    prior to the fabrication of the parts, determine locations at which the parts are to be fabricated with respect to each other in the build envelope, wherein the determined locations correspond to positions of the parts with respect to each other in the object after assembly of the parts.

13. The apparatus of claim 12, wherein the machine readable instructions are further executable to cause the processor to:

determine the locations at which the parts are to be fabricated with respect to each other in the build envelope through implementation of an electrostatic simulation on the parts.

14. A computer-implemented method comprising:
accessing, by a processor of a three-dimensional (3D) fabrication system, data pertaining to fabrication of items of an object, wherein the items are to be joined together to form the object;
modelling, by the processor, a cage to surround the items, wherein the data pertaining to fabrication of the items do not include data pertaining to fabrication of the cage;
controlling, by the processor, fabrication components of the 3D fabrication system to fabricate the items at the determined locations and the cage around the items; and
controlling, by the processor, the fabrication components to fabricate, on a surface of the cage, instructions pertaining to at least one of assembly of the items, finishing of the items, or both.

15. The computer-implemented method of claim 14, further comprising:
identifying placements of removable supports to be fabricated with the items, wherein the removable supports are to temporarily maintain the items in the determined locations following the fabrication of the items and the cage; and
controlling the fabrication components to fabricate the removable supports at the identified placements with the fabrication of the items and the cage.

* * * * *